Jan. 24, 1950
H. D. HERON
2,495,583
BORING TOOL
Filed Aug. 7, 1947
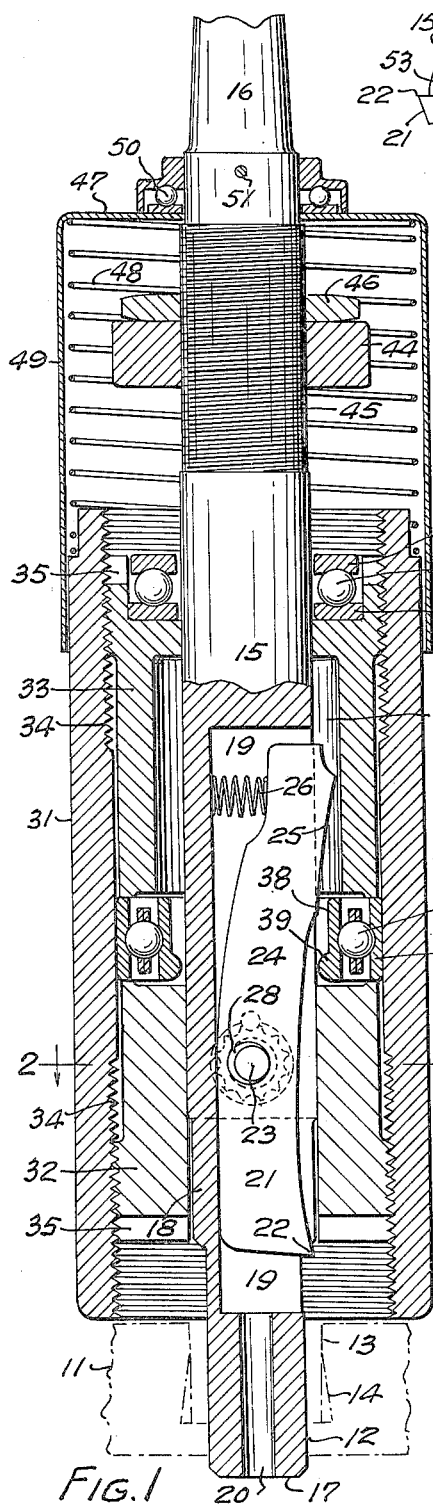
FIG. 1
FIG. 5
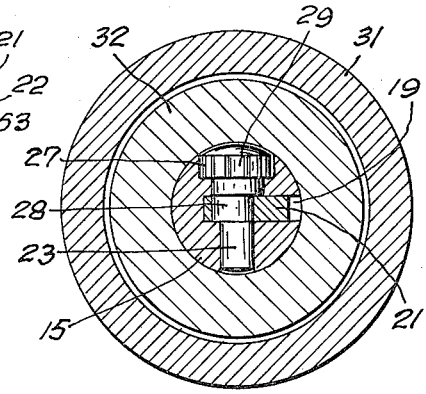
FIG. 3  FIG. 2
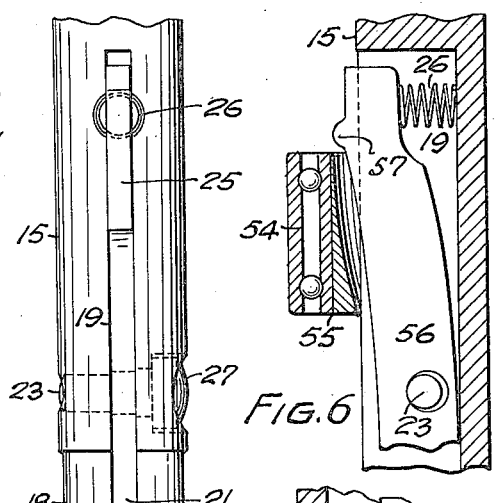
FIG. 6
FIG. 7
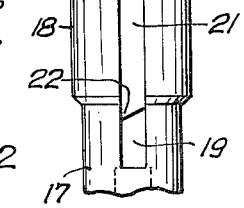
FIG. 4
Inventor
Hugh D. Heron
By
Atty.

Patented Jan. 24, 1950

2,495,583

UNITED STATES PATENT OFFICE 2,495,583

BORING TOOL

Hugh D. Heron, Outremont, Quebec, Canada

Application August 7, 1947, Serial No. 767,133
In Canada March 28, 1945

Section 1, Public Law 690, August 8, 1946
Patent expires March 28, 1965

3 Claims. (Cl. 77—58)

This invention relates to improvements in boring tools and the primary object of the invention is to provide a precision tool for internal undercutting. A further object is to provide an adjustable tool which may be set to perform any desired undercutting operation within its capacity and which when once set will operate automatically to perform that operation an indefinite number of times with absolute accuracy. A still further object is to provide a tool, as aforesaid, having cutting means readily removable for sharpening or for substitution of other cutting means and having cutter mounting means by which the cutter may be adjusted to compensate for removal of metal from the cutting means in sharpening the same. Another object is to provide an internal undercutting tool which may be backed out of a cut without danger of damage to the work surface or to the tool. Still another object is to provide a tool, as aforesaid, of simple and rugged construction, which will be inexpensive to produce and simple and easy to operate. An additional object is to provide a tool of the character described which may be used in a drill press, lathe or portable electric drill or other machine tool. Various other objects and the advantages of the invention may be ascertained from the following description and the accompanying drawings.

Broadly speaking, the invention consists essentially in the provision of a cutter carrying spindle having cutting means movable radially thereof and a work engaging means actuated by movement of the spindle relatively to the work, in the axial direction of the spindle, to move the cutting means radially of the spindle.

In greater detail, the invention consists in the features and combinations of features herein disclosed, together with all such modifications thereof and substitutions of equivalents therefor as are within the scope of the appended claims.

In the accompanying drawings, forming part of this specification, which illustrate certain embodiments of the invention, but to which embodiments and the details thereof the invention is not confined—

Fig. 1 is an elevation, partly in diametric section, of a form of tool suitable for use under conditions which permit the tool to extend beyond the region to be undercut, showing the parts in the relative positions occupied prior to commencement of an undercutting operation.

Fig. 2 is a cross-sectional view of the tool at line 2—2 of Fig. 1.

Fig. 3 is an elevation of a fragment of the cutter carrying spindle, viewed at right angles to the elevation of Fig. 1.

Fig. 4 is an elevation of a fragment of a spindle showing cutter pivot locking means.

Fig. 5 is a cross-sectional view of a spindle at the axis of the cutter pivot, illustrating one manner of mounting two cutters.

Fig. 6 is a fragmentary longitudinal sectional view, similar to Fig. 1, illustrating a modification of the cutter operating means.

Fig. 7 is a fragmentary longitudinal sectional view of a spindle, illustrating an alternative form of cutter operating means.

Referring more particularly to the drawings, 11 designates a work piece having a bore 12, the upper part 13 of which is to be undercut to the form indicated by the lines 14.

The tool of this invention comprises a cylindrical cutter carrying spindle 15 having at one end a driving means such as a tapered chucking shank 16 and having at the opposite end a steady pin 17. The spindle is preferably of uniform diameter from the shank 16 to the steady pin 17, except that the work entering portion 18 of the spindle may be of such smaller diameter than the body of the spindle as is necessary to permit it to enter the work. The steady pin 17 is of such length as the bore permits and is of such diameter as to be a running fit in the bore below the region to be undercut. The spindle is formed with a longitudinal groove 19 extending from the lower end of the work entering portion 18 for a substantial distance toward the shank. The groove is preferably arranged symmetrically with respect to a diametral plane of the spindle and is of sufficient depth to accommodate the cutting means. The groove may extend into the steady pin, as shown, for admission of cuttings which escape through an axial bore 20 formed in the steady pin.

A cutter 21 is mounted in the groove 19 with its cutting point 22 located a short distance beyond the leading or lower end of the spindle portion 18 and is pivoted in the spindle groove by a pin 23 located intermediate the ends of the cutter. The cutter is an easy working fit in the groove. The tail portion 24 of the cutter, on the opposite side of the pin 23 from the point 22, constitutes, in combination with instrumentalities hereafter described, means to move the cutter radially of the spindle, thereby to effect undercutting. The profile of the outer edge 25 of the cutter tail is formed according to the desired radial movement of the cutter point and effects the desired radial movement by reason of longitudinal sliding engagement with a radially immovable means. An expansion spring 26 is disposed between the cutter tail and the bottom of the groove to normally urge the edge 25 against its complementary element and also to retract the cutter point as the tool is withdrawn from the work.

The cutter pivot pin 23 is rotatable about its axis in the spindle 15 and its head 27 is let into the spindle and lies below the surface thereof. That portion 28 of the pin which engages in the cutter is eccentric with respect to the head, so that by partially rotating the pin, the cutter may be moved radially outwardly of the spindle to compensate for removal of metal from the cutter in the sharpening of the same. Any suitable means may be employed to hold the pin against rotation in the spindle once it is inserted. For example, the head may be square or hexagon, fitting into a similarly shaped recess in the spindle but I prefer to use a cylindrical head longitudinally serrated, as shown at 29 in Fig. 4, and co-operating with a locking pin 30 set in the spindle.

The spindle 15 is rotatable within a cylindrical sleeve 31 and is centered in the sleeve by bushings 32 and 33 screw threaded into opposite ends of the sleeve, the threads 34 of the sleeve being extended a considerable distance inwardly from the sleeve ends so as to permit of considerable adjustment of the bushings in the longitudinal direction of the sleeve. The outer ends of the bushings 32 and 33 are provided with recesses 35 for reception of a wrench to adjust the bushings. A ball bearing 36 is disposed in the sleeve between the bushings, its outer race ring 37 being preferably a light tapping fit in the sleeve and being held clamped between the adjacent ends of the bushings so that the bearing is normally held against movement longitudinally of the sleeve but may be adjusted along the sleeve by rotation of the bushings. The ends of the bushings are recessed to leave the inner race ring 38 of the bearing freely rotatable. The inner surface of the inner race ring is preferably provided with an inwardly extending flange or rib 39, of semi-circular or other suitable cross-section, which has a small clearance from the spindle 15.

As will be seen, the bearing 36 encircles the tail 24 of the cutter, the outer edge 25 of which is constantly urged against the rib 39 by the spring 26. Thus, if the spindle 15 is moved lengthwise through the sleeve 31, the travel of the cutter tail on the rib 39 will, because of the inclination of the edge 25 relatively to the spindle axis, cause the cutter point to be moved radially of the spindle, at points in the spindle travel and to the extent determined by the profile of the edge 25. The frictional contact of the cutter tail and the rib 39 is such that the inner race ring rotates with the spindle. The bushing 33 has sufficient clearance 40 from the spindle to permit entry of the cutter tail as the spindle advances through the sleeve.

The upper or outer end of the bushing 33 is recessed to receive a thrust bearing 41, the inner race ring 42 of which is a press fit in the bushing and has running clearance from the spindle. The outer race ring 43 has running clearance from both the bushing and the spindle. A thrust collar 44 is screw threaded on the spindle outside the thrust bearing 41, the spindle threads 45 extending a sufficient distance along the spindle to permit of considerable adjustment of the collar along the spindle. Any suitable collar locking means may be provided, such as the jam nut 46 threaded on the spindle outside the collar.

A freely rotatable washer 47 may be provided on the spindle outside the jam nut to retain a helical spring 48 in compression against the adjacent end of the sleeve. The washer may be provided with a skirt 49 loosely surrounding the adjacent end of the sleeve to shroud the spring 48 and to exclude dust and foreign matter from the bearing 41 and thrust collar 44. The spring need not be of strength greater than is required to cause retraction of the lower end of the spindle into the sleeve, to the position shown in Fig. 1. The washer may be retained by a thrust type ball bearing 50 fixed to the spindle outside the washer by any suitable means, such as the pin 51.

It will be understood that the portions 17 and 18 of the spindle are made of a size suitable to the work and that the edge 25 of the cutter is designed and formed according to the desired profile of the undercut to be made. By adjusting the bushings 32 and 33 in the sleeve, the bearing rib 39 is moved to adjust the depths at which the undercutting will commence and will stop. By adjusting the thrust collar on the spindle, the point at which the advance of the spindle will stop is determined.

The operation of the tool already described is very simple and easy. If the tool is used in the vertical position illustrated, as in a drill press, the spring 48 is not necessary, as the sleeve will fall by gravity to the relative position shown and will rest on the work when the tool is lowered to cutting position. The spring is, however, necessary to maintain contact of the work by the sleeve if the tool is used in a horizontal position, as in a lathe or in a portable electric drill, or in an inverted position. The spring serves also to retract the spindle into the sleeve when the tool is in storage or otherwise idle, thus to protect the cutter. When the sleeve is in the normal idle position illustrated, the upper or inner end of the cutter tail abuts the upper end of the clearance space 40 and forms a stop to prevent the sleeve sliding off the spindle. The sleeve may be manually lifted to observe if the steady pin 17 is aligned with the bore 12 of the work and when alignment is effected, the sleeve is released to contact the work piece and the downward feed of the tool is commenced to move the spindle down through the sleeve. The spring 26 presses the cutter tail outwards towards the rib 39 and thus holds the point of the cutter retracted into the spindle so that it will not prematurely engage the work. At, or after, the time the point of the cutter enters into the bore 12, depending on where the undercut is to start, the inclined edge 25 of the cutter tail engages the rib 39 of the bearing 36 and, as the spindle moves down, the cutter tail is forced into the spindle groove and the point of the cutter is forced out from the spindle to have cutting engagement with the work. The outward movement of the cutter point may be in constant ratio to the longitudinal movement of the spindle, in which case a straight taper will be cut, or the movements may be in a variable ratio, depending on the profile of the cutter tail edge 25. The downward movement of the spindle is continued until the thrust collar 44 on the spindle engages the thrust bearing 41 of the sleeve and stops the downward movement. When the tool is withdrawn from the work, the foregoing operation is reversed and the spindle rises through the sleeve, permitting the spring 26 to retract the cutter point so that it does not mar the surface of the undercut and cannot be itself damaged by catching on the work. Normally, the sleeve and its contained parts, also the washer 47 and spring 48, do not rotate because of the frictional contact of the sleeve with the work.

If the work to be done does not permit of using a steady pin at the end of the spindle, a spindle 52 is used which terminates at the lower or outer end of the work engaging portion 18 and the diameter of this portion is then such as to be a smooth running fit in the upper end of the bore to be undercut, or in a steady head, so as to support the spindle against oscillation due to the lateral thrust of the cutter.

In some instances, especially where a steady pin cannot be used, it is desirable to counteract the lateral thrust of a single cutter by using two oppositely disposed cutters, as shown in Fig. 5. In this form of tool, the groove 19 of Fig. 1 is replaced by a slot 53 extending through the spindle and accommodating two cutters 21 mounted and operated as already described.

In Fig. 6 there is illustrated a modification of the cutter controlling means, which is the mere reversal of the arrangement shown in Fig. 1. In this modification, the bearing 36 is replaced by a longitudinally extended bearing 54, the inner race ring 55 of which has its inner surface profiled to replace the profiled edge 25 of the cutter 21. In this form the cutter 56 is similar to the cutter 21, except that its tail is provided with a projection or finger 57 to traverse longitudinally the inner surface of the race ring 55 and move the cutter point according to the profile of the race ring.

In those embodiments of the invention thus far described, radial movement of the cutter has been effected by relative longitudinal movement of the spindle and the sleeve. In Fig. 7 there is illustrated a modification in which radial movement of the cutter is effected by relative movement of the spindle and a member independent of the sleeve. It will be noted, however, that in each case the radial movement of the cutter is effected by relative longitudinal movement of the spindle and a work engaging member. In this modification, the lower end of the spindle 58 carries an axially disposed pin 59 which is slidable into the spindle against the urge of the spring 60 but is not rotatable. The lower or outer end of this pin is adapted for engagement with the bottom of a bore to be undercut. The spring 26 under the tail of the cutter 61 maintains the inner edge 62 of the cutter in engagement with the adjacent surface of the pin 59. One of these contacting surfaces is profiled, as already described, to effect radial movement of the cutter upon inward movement of the pin and the other of the surfaces is provided with a projection 63 to engage the profiled surface. As illustrated, the cutter edge is profiled and the projection 63 is formed on the pin, but it will be obvious the arrangement may be the reverse.

From the foregoing it will be observed the tool is simple in construction and positive in action, the cutter being urged outwardly by the movement of the spindle relatively to means held stationary by engagement with the work. Once the tool has been adjusted for a desired cut, the radial feeding of the cutter is automatically proportioned to the longitudinal feed so that it will perform an indefinite number of exactly similar undercutting operations. The adjustments of the bushings 32 and 33 and the bearing 36, also of the thrust collar 44, may be very accurate, as may be the adjustment of the cutter.

Having thus described my invention, I claim:

1. A boring tool comprising a work engaging sleeve; a pair of bushings in said sleeve; a longitudinally slotted spindle rotatable and slidable in said bushings; a cutter pivoted in the spindle slot, having a tail portion normally spring pressed beyond the surface of the spindle; cutter positioning means encircling the spindle and cutter and positioned by said bushings for engagement by the cutter tail upon axial movement of the spindle relatively to the sleeve, to move the cutter radially outward of the spindle; said bushings clamping said cutter positioning means between them and being adjustable in the sleeve in the axial direction thereof to adjust the position of said means, thereby to select the portion of spindle travel in which the cutter is projected from the spindle.

2. Structure according to claim 1 in which said cutter positioning means comprises inner and outer ring members and a ball bearing between them, said outer member being clamped between the bushings and said inner member being free for rotation and spaced from the spindle.

3. In combination with structure according to claim 1, a ball thrust bearing carried by the sleeve; and a thrust collar adjustable longitudinally on the spindle and adapted to engage said bearing to limit movement of the spindle in one direction, said cutter being engageable with one of said bushings to limit movement of the spindle in the opposite direction.

HUGH D. HERON.

REFERENCES CITED

The following references are of record in the file of this patent:

UNITED STATES PATENTS

| Number | Name | Date |
| --- | --- | --- |
| 524,375 | Blue | Aug. 14, 1894 |
| 1,170,221 | Craven | Feb. 1, 1916 |
| 1,299,856 | Nethercutt | Apr. 8, 1919 |
| 1,536,208 | Gosper | May 5, 1925 |
| 1,883,810 | Miller | Oct. 18, 1932 |
| 2,314,084 | Fried | Mar. 16, 1943 |